United States Patent
de Dinechin et al.

(10) Patent No.: US 8,091,090 B2
(45) Date of Patent: Jan. 3, 2012

(54) METHOD FOR PROVIDING SCRATCH REGISTERS FOR USE BY A VIRTUAL-MACHINE MONITOR

(75) Inventors: Christophe de Dinechin, Roquebrune sur Argens (FR); Todd Kjos, Los Altos, CA (US); Jonathan Ross, Woodinville, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2054 days.

(21) Appl. No.: 11/030,530

(22) Filed: Jan. 5, 2005

(65) Prior Publication Data

US 2006/0026389 A1 Feb. 2, 2006

Related U.S. Application Data

(63) Continuation-in-part of application No. 10/909,968, filed on Jul. 31, 2004, now abandoned.

(51) Int. Cl.
*G06F 3/00* (2006.01)
*G06F 9/455* (2006.01)
(52) U.S. Cl. .......................................... 719/310; 718/1
(58) Field of Classification Search .................. 719/310; 717/134; 718/1; 708/1
See application file for complete search history.

(56) References Cited

U.S. PATENT DOCUMENTS

| 5,481,693 A | * | 1/1996 | Blomgren et al. | 712/225 |
| 5,623,617 A | * | 4/1997 | Davidian | 712/227 |
| 7,260,815 B1 | * | 8/2007 | Chen et al. | 717/134 |
| 2004/0181785 A1 | * | 9/2004 | Zwirner et al. | 717/140 |

OTHER PUBLICATIONS

Ashutosh, Saving and Restoring Implementation Contexts with co-Designed Virtual Machines, 2001.*

* cited by examiner

*Primary Examiner* — Lechi Truong

(57) ABSTRACT

In one embodiment of the present invention, a virtual-machine monitor detects entry and exit from guest-operating system code, storing the values of a set of high-order floating point registers in memory on entry, and restoring the values of the set of high-order floating point registers on exit. The virtual-machine monitor can then use the set of high-order floating point registers as scratch registers for emulation of guest-operating-system instructions. In alternative embodiments, a virtual-machine monitor obtains scratch registers for any code that the virtual-machine monitor can detect entry into and exit from, and for which a set of infrequently used registers can be identified, by storing the current contents of the set of registers upon detected entry into the code and restoring the original contents of the set of registers upon exit from the code.

9 Claims, 17 Drawing Sheets

Application Register Set
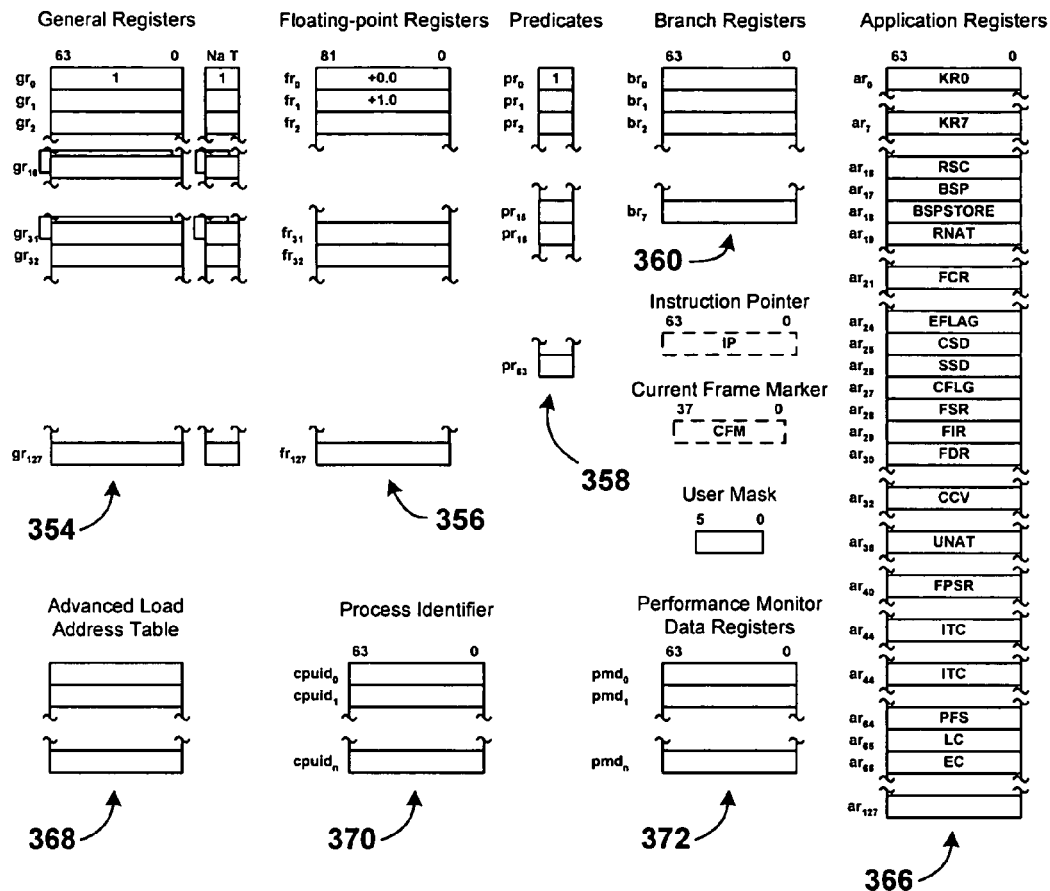
System Register Set
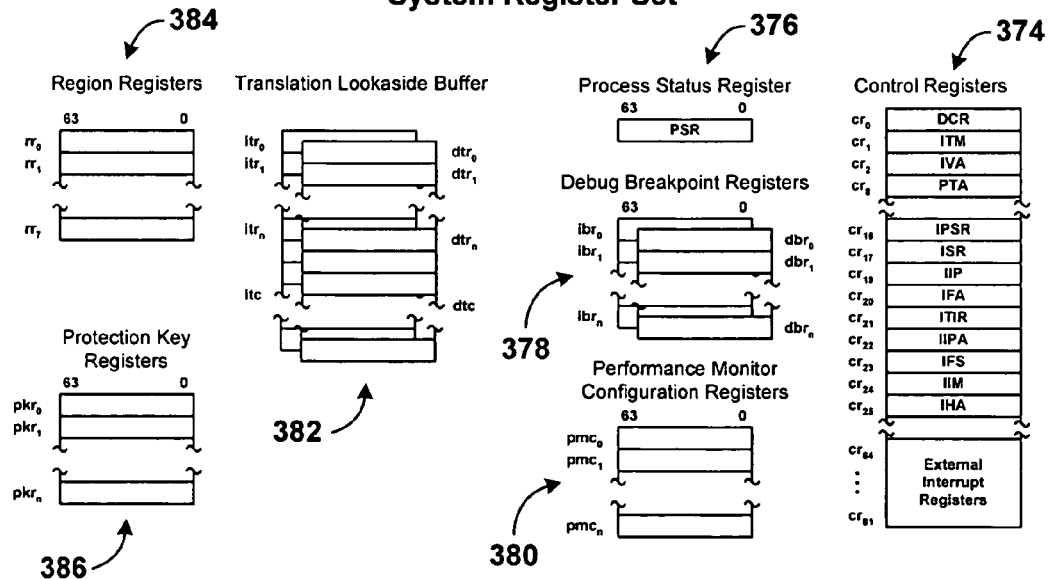
Figure 3B

| TLB.ar | TLB.pl | PRIVILEGE LEVEL | | | | DESCRIPTION |
|---|---|---|---|---|---|---|
| | | 3 | 2 | 1 | 0 | |
| 0 | 3 | R | R | R | R | READ ONLY |
| | 2 | | R | R | R | |
| | 1 | | | R | R | |
| | 0 | | | | R | ←710 |
| 1 | 3 | RX | RX | RX | RX | READ, EXECUTE |
| | 2 | | RX | RX | RX | |
| | 1 | | | RX | RX | |
| | 0 | | | | RX | |
| 2 | 3 | RW | RW | RW | RW | READ, WRITE |
| | 2 | | RW | RW | RW | |
| | 1 | | | RW | RW | |
| | 0 | | | | RW | |
| 3 | 3 | RWX | RWX | RWX | RWX | READ, WRITE, EXECUTE |
| | 2 | | RWX | RWX | RWX | |
| | 1 | | | RWX | RWX | |
| | 0 | | | | RWX | |
| 4 | 3 | R | RW | RW | RW | READ ONLY/ READ, WRITE |
| | 2 | | R | RW | RW | |
| | 1 | | | R | RW | |
| | 0 | | | | RW | |
| 5 | 3 | RX | RX | RX | RWX | READ, EXECUTE/ READ, WRITE, EXEC |
| | 2 | | RX | RX | RWX | |
| | 1 | | | RX | RWX | |
| | 0 | | | | RWX | |
| 6 | 3 | RWX | RW | RW | RW | READ, WRITE, EXECUTE/ READ, WRITE |
| | 2 | | RWX | RW | RW | |
| | 1 | | | RWX | RW | |
| | 0 | | | | RW | |
| 7 | 3 | X | X | X | RX | EXEC, PROMOTE/ READ, EXECUTE |
| | 2 | XP2 | X | X | RX | |
| | 1 | XP1 | XP1 | X | RX | |
| | 0 | XP0 | XP0 | XP0 | RX | |

Figure 7

| | |
|---|---|
| X: | • |
| | mov r125 = offset |
| | shl r125 = r125, 10 |
| | add r126 - r125, r16 |
| | ld8 r125 = [r126] |
| | br.call = r125 |
| | |
| vmthash: | self.sig f127 = r31 ⟵ 1802 |
| | self.sig f126 = r30 ⟵ 1804 |
| | mov1 r31 = Address Region Register |
| | xor r31 = r31, r125 |
| | mov r30, Hash Mack |
| | and r31 = r31, r30 |
| | mov1 r30 = Guest PTA Address |
| | ld8 r30 =[r30] |
| | add r8 = r30, 31 |
| | getf.sig r30 = f126 ⟵ 1808 |
| | getf.sig r31 = f127 ⟵ 1810 |
| | br.ret |

Figure 18

METHOD FOR PROVIDING SCRATCH REGISTERS FOR USE BY A VIRTUAL-MACHINE MONITOR

CROSS REFERENCE TO RELATED APPLICATION

This application is a continuation-in-part of U.S. application Ser. No. 10/909,968, filed Jul. 31, 2004, now abandoned.

TECHNICAL FIELD

The present invention is related to computer architecture, operating systems, and virtual-machine monitors, and, in particular, to a method for facilitating instruction emulation by a virtual-machine monitor.

BACKGROUND OF THE INVENTION

During the past 50 years, computer hardware, architecture, and operating systems that run on computers have evolved to provide ever-increasing storage space, execution speeds, and features that facilitate computer intercommunication, security, application-program development, and ever-expanding range of compatibilities and interfaces to other electronic devices, information-display devices, and information-storage devices. In the 1970's, enormous strides were made in increasing the capabilities and functionalities of operating systems, including the development and commercial deployment of virtual-memory techniques, and other virtualization techniques, that provide to application programs the illusion of extremely large address spaces and other virtual resources. Virtual memory mechanisms and methods provide 32-bit or 64-bit memory-address spaces to each of many user applications concurrently running on computer system with far less physical memory.

Virtual machine monitors provide a powerful new level of abstraction and virtualization. A virtual machine monitor comprises a set of routines that run directly on top of a computer machine interface, and that, in turn, provides a virtual machine interface to higher-level programs, such as operating systems. An operating system, referred to as a "guest operating system," runs above, and interfaces to, a well-designed and well-constructed virtual-machine interface just as the operating system would run above, and interface to, a bare machine.

A virtual-machine monitor uses many different techniques for providing a virtual-machine interface, essentially the illusion of a machine interface to higher-level programs. A virtual-machine monitor may pre-process operating system code to replace privileged instructions and certain other instructions with patches that emulate these instructions. The virtual-machine monitor generally arranges to intercept and emulate the instructions and events which behave differently under virtualization, so that the virtual-machine monitor can provide virtual-machine behavior consistent with the virtual machine definition to higher-level software programs, such as guest operating systems and programs that run in program-execution environments provided by guest operating systems. The virtual-machine monitor controls physical machine resources in order to fairly allocate physical machine resources among concurrently executing operating systems and preserve certain physical machine resources, or portions of certain physical machine resources, for exclusive use by the virtual-machine monitor.

When a virtual-machine monitor emulates instruction, the virtual-machine monitor may need to introduce a multi-instruction patch routine that computes values not computed in the original code. In particular, the patch routine may need to access memory locations. In certain cases, the virtual-monitor needs to use additional registers, but, in certain machine architectures, there may be no registers that can be certain to be useable. Even storing register contents to memory to free a scratch register requires an available scratch register to contain the memory location, for example. Designers, implementers, manufacturers, and users of virtual-machine monitors and virtual-monitor-containing computer systems have recognized the need for a method by which virtual-machine monitors can obtain scratch registers for use during instruction emulation.

SUMMARY OF THE INVENTION

In one embodiment of the present invention, a virtual-machine monitor detects entry and exit from guest-operating system code, storing the values of a set of high-order floating point registers in memory on entry, and restoring the values of the set of high-order floating point registers on exit. The virtual-machine monitor can then use the set of high-order floating point registers as scratch registers for emulation of guest-operating-system instructions. In alternative embodiments of the present invention, a virtual-machine monitor obtains scratch registers for any code that the virtual-machine monitor can detect entry into and exit from, and for which a set of infrequently used registers can be identified, by storing the current contents of the set of registers upon detected entry into the code and restoring the original contents of the set of registers upon exit from the code, emulating access to the set of registers in the original code.

BRIEF DESCRIPTION OF THE DRAWINGS

FIGS. 3A-B show the registers within an Itanium processor.

FIG. 7 shows the access rights encoding used in a TLB entry.

FIG. 18 shows a solution to the binary-translation problem illustrated in FIGS. 11-12 using an embodiment of the present invention.

DETAILED DESCRIPTION OF THE INVENTION

Embodiments of the present invention are directed to methods for provided register scratch space for virtual-monitor binary translations inserted into guest-operating-system code for emulating instructions on behalf of the guest operating system. One approach to instruction emulation by virtual-machine monitors is to arrange for a machine interrupt or fault to occur for each guest-operating-system instruction that the virtual-machine monitor needs to emulate. Upon an interruption or fault, the virtual-monitor interruption and fault-handling routines are automatically invoked, and provided with normal processing resources (in Itanium, a bank of scratch registers for immediate use). However, the interruption and fault mechanisms, including invocation of interruption and fault handlers, is a rather expensive emulation technique, particularly for instructions that can be emulated by the virtual-machine monitor using between one and a handful of alternative instructions. Binary translation, in which the virtual-machine monitor patches guest-operating-system code in order to override instructions to be emulated with branch instructions that transfer control to virtual-monitor patch code, avoids the overhead of interruption and fault generation and handling. However, on certain computer architectures, including the Itanium architecture, there are problems associated with binary translation. A described embodiment makes use of Intel Itanium® architecture features. Additional information concerning virtual memory, virtual-machine monitors, and the Itanium architecture are first provided, in a following subsection, followed by a detailed discussion of several embodiments of the present invention, in a subsequent subsection.

Figure 1:
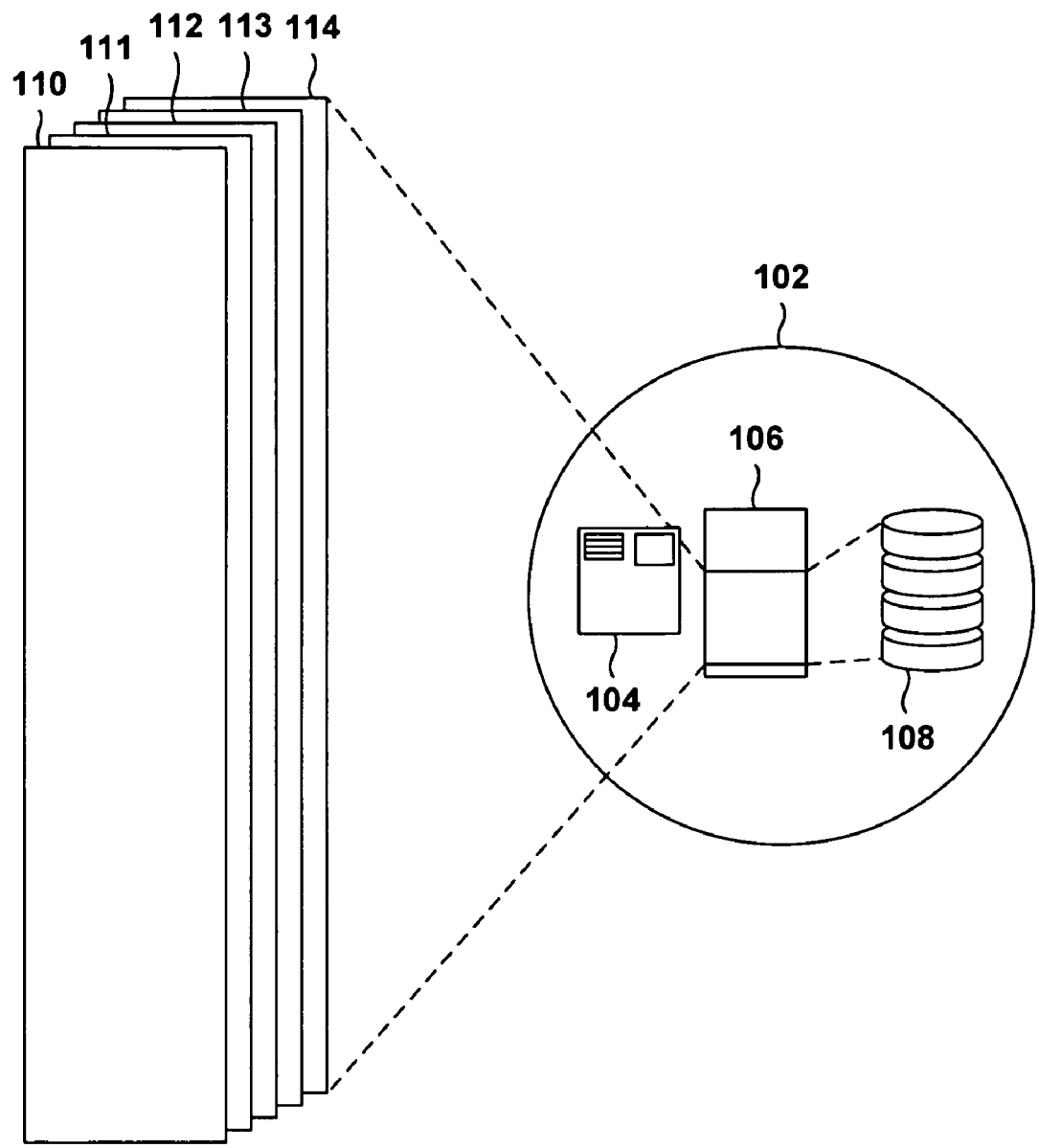
FIG. 1 illustrates virtual memory provided by a combined operating-system/hardware system.

Additional Information About Virtual Memory, Virtual Monitors, and the Intel® Itanium Computer Architecture Virtual Memory FIG. 1 illustrates virtual memory provided by a combined operating-system/hardware system. In FIG. 1, the operating system is abstractly represented as a circle 102 enclosing hardware components including a processor 104, physical memory 106, and mass-storage devices 108. FIG. 1 is intended to abstractly represent certain features of the hardware system, or machine, rather than to accurately represent a machine or enumerate the components of a machine. In general, the operating system provides, to each process executing within the execution environment provided by the operating system, a large virtual-memory address space, represented in FIG. 1 by vertical columns external to the operating system, such as vertical column 110. The virtual-memory address space defines a sequence of addressable memory bytes with addresses ranging from 0 to $2^{64}-1$ for a combined operating-system/hardware system supporting 64-bit addresses. The Itanium virtual address space is up to 85 bits wide, comprising a 61-bit offset and a 24-bit region selector, with a 64-bit address space accessible at any point in time. Depending on the machine and operating system, certain portions of the virtual-memory address space may be inaccessible to a process, and various mechanisms may be used to extend the size of the virtual-memory address space beyond the maximum size addressable by the machine-supported addressing unit. An operating system generally provides a separate virtual-memory address space to each process concurrently executing on top of the operating system, so that, as shown in FIG. 1, the operating system may simultaneously support a number of distinct and separate virtual-memory address spaces 110-114.

A virtual-memory address space is, in many respects, an illusion created and maintained by the operating system. A process or thread executing on the processor 104 can generally access only a portion of physical memory 106. Physical memory may constitute various levels of caching and discrete memory components distributed between the processor and separate memory integrated circuits. The physical memory addressable by an executing process is often smaller than the virtual-memory address space provided to a process by the operating system, and is almost always smaller than the aggregate size of the virtual-memory address spaces simultaneously provided by the operating system to concurrently executing processes. The operating system creates and maintains the illusion of relatively vast virtual-memory address spaces by storing the data, addressed via a virtual-memory address space, on mass-storage devices 108 and rapidly swapping portions of the data, referred to as pages, into and out from physical memory 106 as demanded by virtual-memory accesses made by executing processes. In general, the patterns of access to virtual memory by executing programs are highly localized, so that, at any given instant in time, a program may be reading to, and writing from, only a relatively small number of virtual-memory pages. Thus, only a comparatively small fraction of virtual-memory accesses require swapping of a page from mass-storage devices 108 to physical memory 106.

Virtual Monitors

Figure 2:
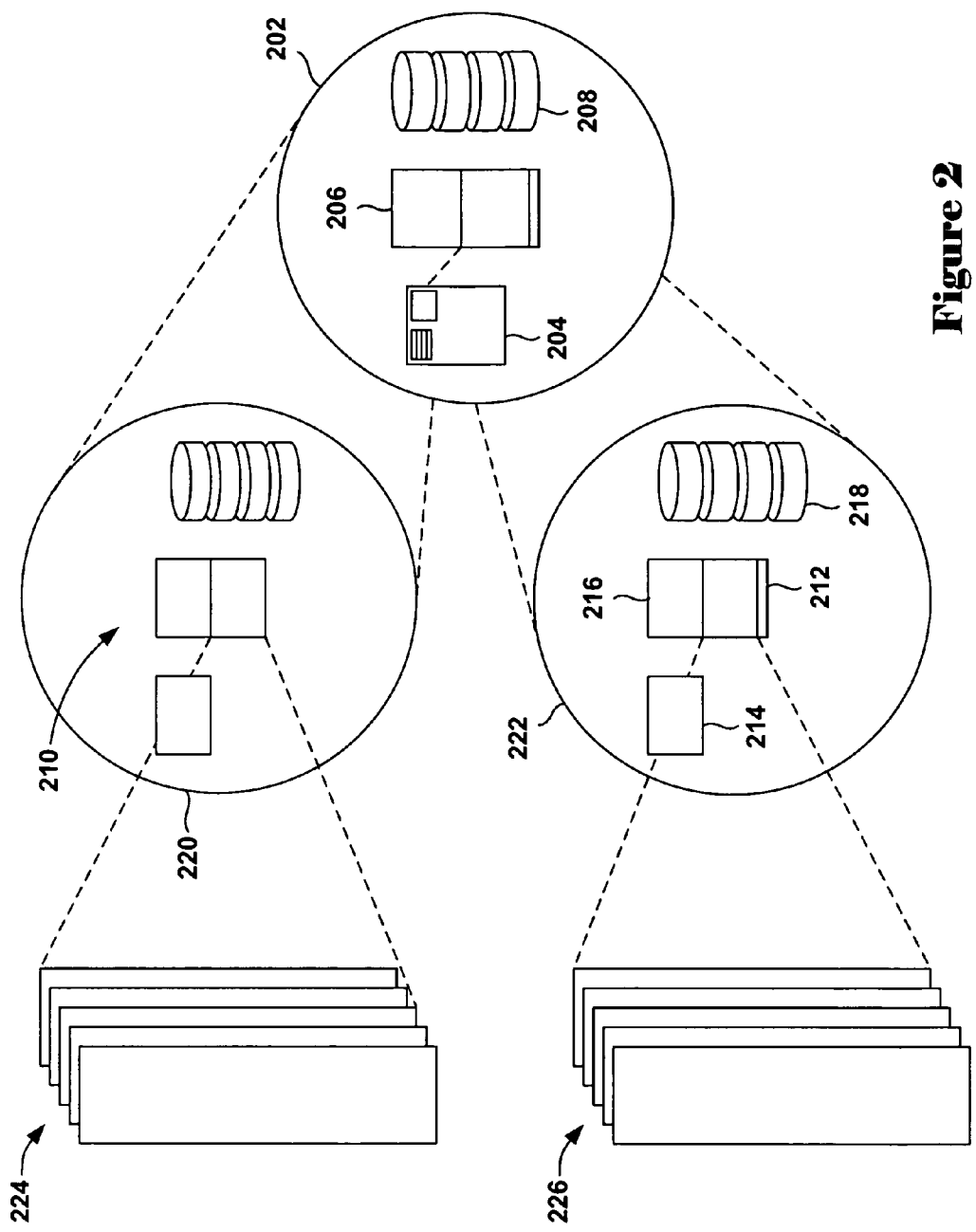
FIG. 2 illustrates a monitor-based approach to supporting multiple, concurrently executing operating systems.

A virtual-machine monitor is a set of routines that lie above the physical machine interface, and below all other software routines and programs that execute on a computer system. A virtual-machine monitor, also referred to as a "hypervisor" or simply as a "monitor," provides a virtual-machine interface to each operating system concurrently executing on the computer system. The virtual-machine interface includes those machine features and characteristics expected of a machine by operating systems and other programs that execute on machines. For example, a virtual-machine interface includes a virtualized virtual-memory-system interface. FIG. 2 illustrates a virtual-monitor-based approach to supporting multiple, concurrently executing operating systems. In FIG. 2, a first circle 202 encloses the physical processor 204, physical memory 206, and mass-storage devices 208 of a computer system. The first enclosing circle 202 represents a virtual-machine monitor, a software layer underlying the traditional operating-system software layer of the computer system. The virtual-machine monitor provides virtual-machine interfaces 210 and 212. The virtual machine can be considered to include a virtual processor, virtual physical memory, and virtual mass-storage devices, e.g., 214, 216, 218, respectively. Operating system software layers can be considered to encapsulate each virtual machine, such as operating systems 220 and 222 represented by circles in FIG. 2. In turn, the operating systems each provide a number of guest-virtual-memory address spaces 224 and 226 to processes concurrently executing within the execution environments provided by the operating systems. The virtual-machine monitor may provide multiple virtual processors to guest operating systems, and may provide a different number of virtual processors than the number of physical processors contained in the computer system.

In many virtual-monitor implementations, the majority of guest operating system instructions are directly executed by the hardware processor, with the monitor primarily responsible for virtualizing system instructions on behalf of guest operating systems. A virtual monitor can detect attempts by guest operating systems to raise the priority level to a most privileged priority level, at which system instructions can be executed, as well as detect attempts to execute individual privileged system instructions and attempts to execute non-privileged instructions that also need to be virtualized by the virtual monitor. Methods for detecting privilege level changes and attempts to execute system instructions are discussed, below. As discussed below, in certain machine architectures, a virtual monitor needs to acquire certain processing resources, such as scratch registers, in order to emulate system instructions and to virtualize other guest code. In various embodiments of the present invention, the virtual monitor seeks to identify little-used or unused processor resources for implementing various virtualization tasks.

Intel Itanium® Architecture

Figure 3A:
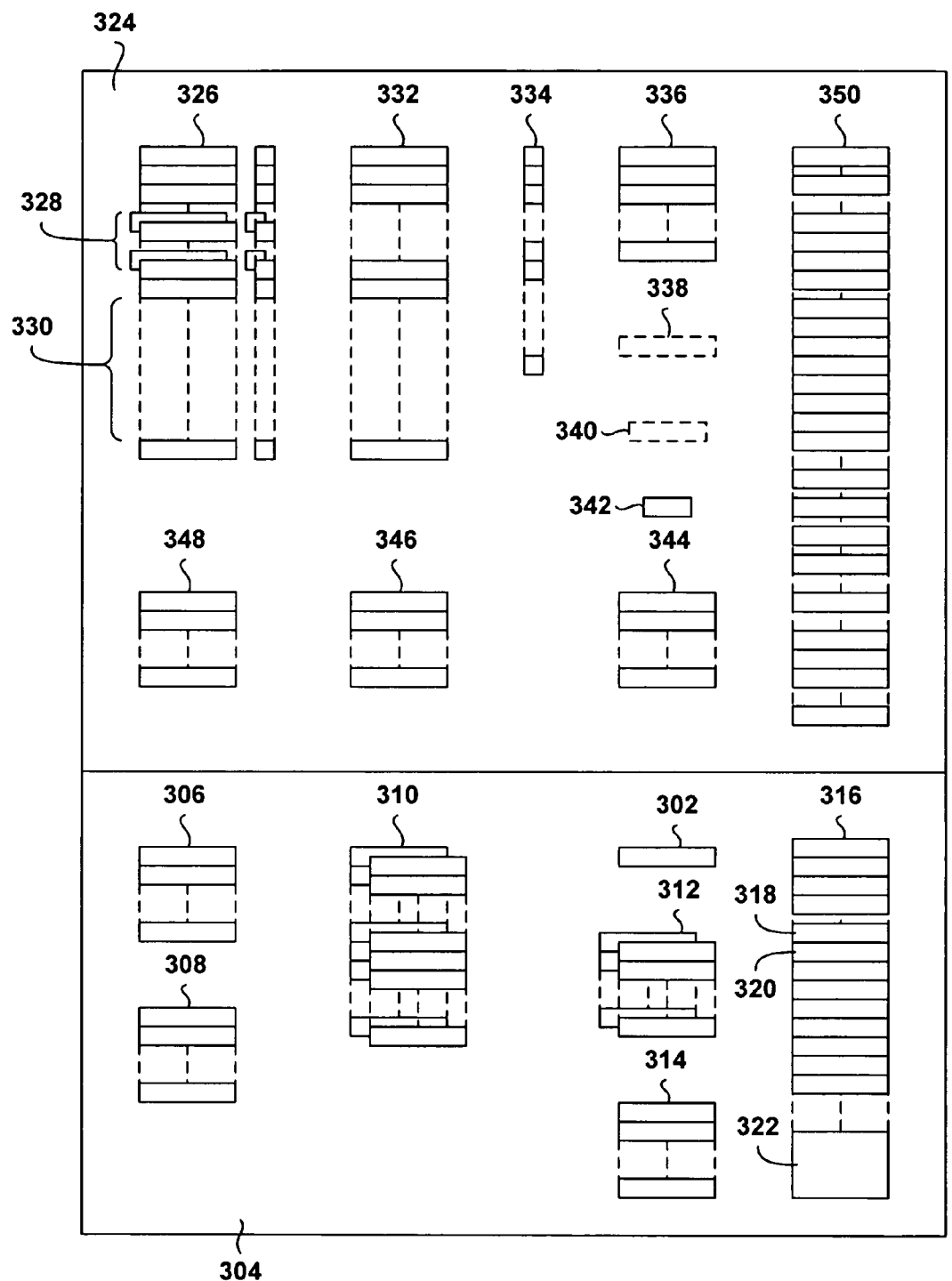
Figure 4:
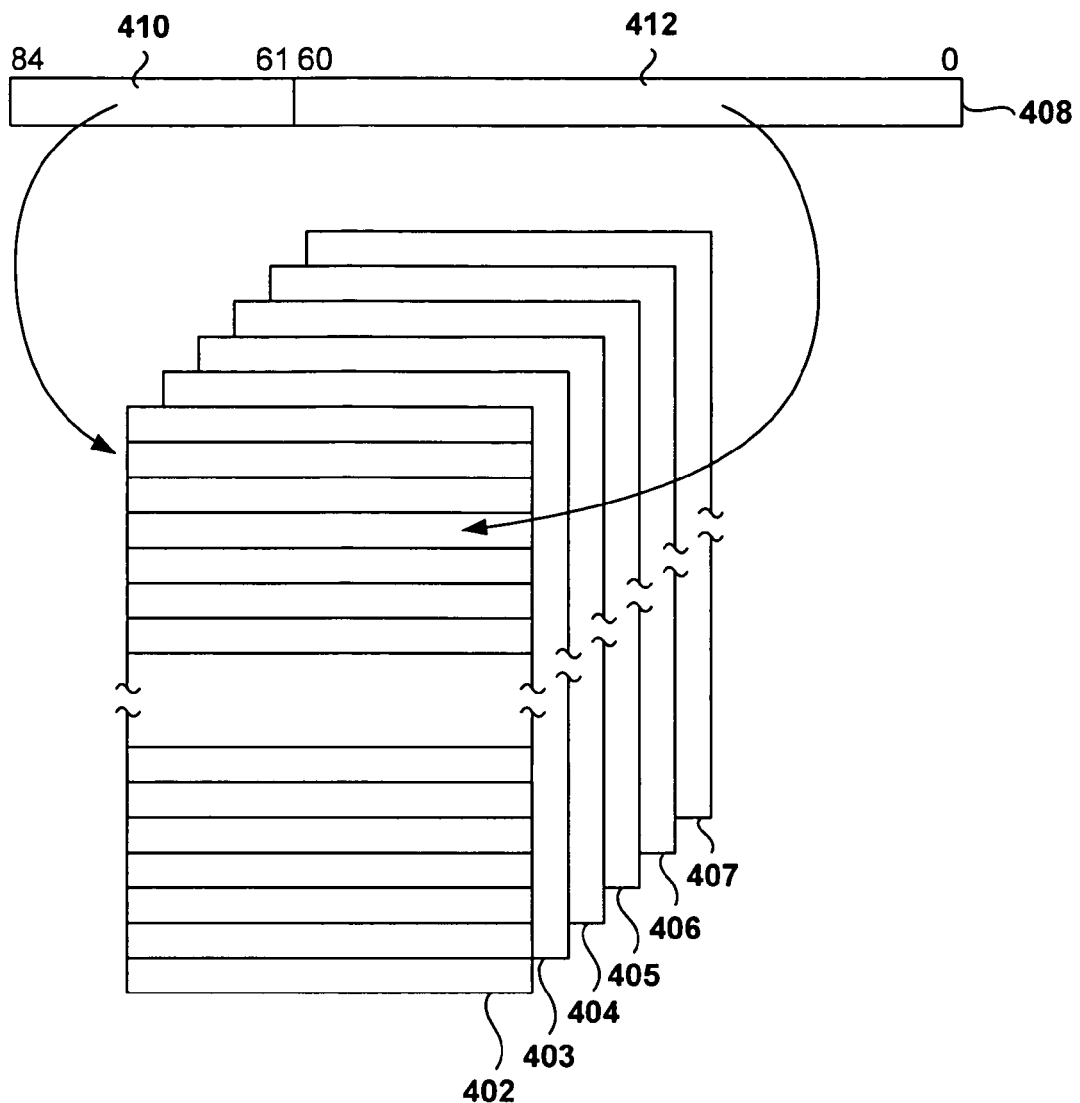
FIG. 4 illustrates the virtual address space provided by one modern computer architecture.

Processors, such as Intel Itanium® processors, built to comply with the Intel® Itanium computer architecture represent one example of a modern computer hardware platform suitable for supporting a monitor-based virtual machine that in turn supports multiple guest-operating-systems, in part by providing a virtual physical memory and virtual-address translation facilities to each guest operating system. FIGS. 3A-B show the registers within an Itanium processor. FIG. 3A is a block diagram showing the registers within the processor. The registers hold values that define the execution state of the processor, and, when saved to memory, capture the machine state of an executing process prior to stopping execution of the process. Restoring certain registers saved in memory allows for resumption of execution of an interrupted process. The register set shown in FIGS. 3A-B is quite complex, and only certain of the registers are described, below.

The process status register ("PSR") 302 is a 64-bit register that contains control information for the currently executing process. The PSR comprises many bit fields, including a 2-bit field that contains the current privilege level ("CPL") at which the currently executing process is executing. There are four privilege levels: 0, 1, 2, and 3. The most privileged privilege level is privilege level 0. The least privileged privilege level is privilege level 3. Only processes executing at privilege level 0 are allowed to access and manipulate certain machine resources, including the subset of registers, known as the "system-register set," shown in FIG. 3A within the lower rectangle 304. One control register, the interruption processor status register ("IPSR") 318, stores the value of the PSR for the most recently interrupted process. The interruption status register ("ISR") 320 contains a number of fields that indicate the nature of the interruption that most recently occurred to an interruption handler when the PSR.ic field flips from "1," at the time of a fault or interrupt, to "0" as the interruption handler is invoked. Other control registers store information related to other events, such as virtual memory address translation information related to a virtual address translation fault, pointers to the last successfully executed instruction bundle, and other such information. Sets of external interrupt control registers 322 are used, in part, to set interrupt vectors. The IHA register stores an indication of a virtual hash page table location at which the virtual-address translation corresponding to a faulting virtual address should be found.

The registers shown in FIG. 3A in the upper rectangular region 324 are known as the "application-register set." These registers include a set of general registers 326, sixteen of which 328 are banked in order to provide immediate registers for interruption handling code. At least 96 general registers 330 form a general-register stack, portions of which may be automatically stored and retrieved from backing memory to facilitate linkages among calling and called software routines. The application-register set also includes floating point registers 332, predicate registers 334, branch registers 336, an instruction pointer 338, a current frame marker 340, a user mask 342, performance monitor data registers 344, processor identifiers 346, an advanced load address table 348, and a set of specific application registers 350.

FIG. 3B shows another view the registers provided by the Itanium architecture, including the 128 64-bit general purpose registers 354, a set of 128 82-bit floating point registers 356, a set of 64 predicate registers 358, a set of 8 branch registers 360, a variety of special purpose registers including application registers ("AR") $AR_0$ through $AR_{127}$ 366, an advance load address table 368, process-identifier registers 370, performance monitor data registers 372, the set of control registers ("CR") 374, ranging from $CR_0$ to $CR_{81}$, the PSR register 376, break point registers 378, performance monitor configuration registers 380, a translation lookaside buffer 382, region registers 384, and protection key registers 386. Note that particular AR registers and CR registers have acronyms that reflect their use. For example, AR register $AR_{17}$ 388, the backing-store-pointer register, is associated with the acronym BSP, and this register may be alternatively specified as the BSP register or the AR[BSP] register. In many of the registers, single bits or groups of bits comprise fields containing values with special meanings. For example, the two least significant bits within register AR[RSC] 390 together compose a mode field which controls how aggressively registers are saved and restored by the processor. These two bits can be notationally specified as "AR[RSC].mode."

The memory and virtual-address-translation architecture of the Itanium computer architecture is described below, with references to FIGS. 4-7. The virtual address space defined within the Intel Itanium computer architecture includes $2^{24}$ regions, such as regions 402-407 shown in FIG. 4, each containing $2^{61}$ bytes that are contiguously addressed by successive virtual memory addresses. Thus, the virtual memory address space can be considered to span a total address space of $2^{85}$ bytes of memory. An 85-bit virtual memory address 408 can then be considered to comprise a 24-bit region field 410 and a 61-bit address field 412.

Figure 5:
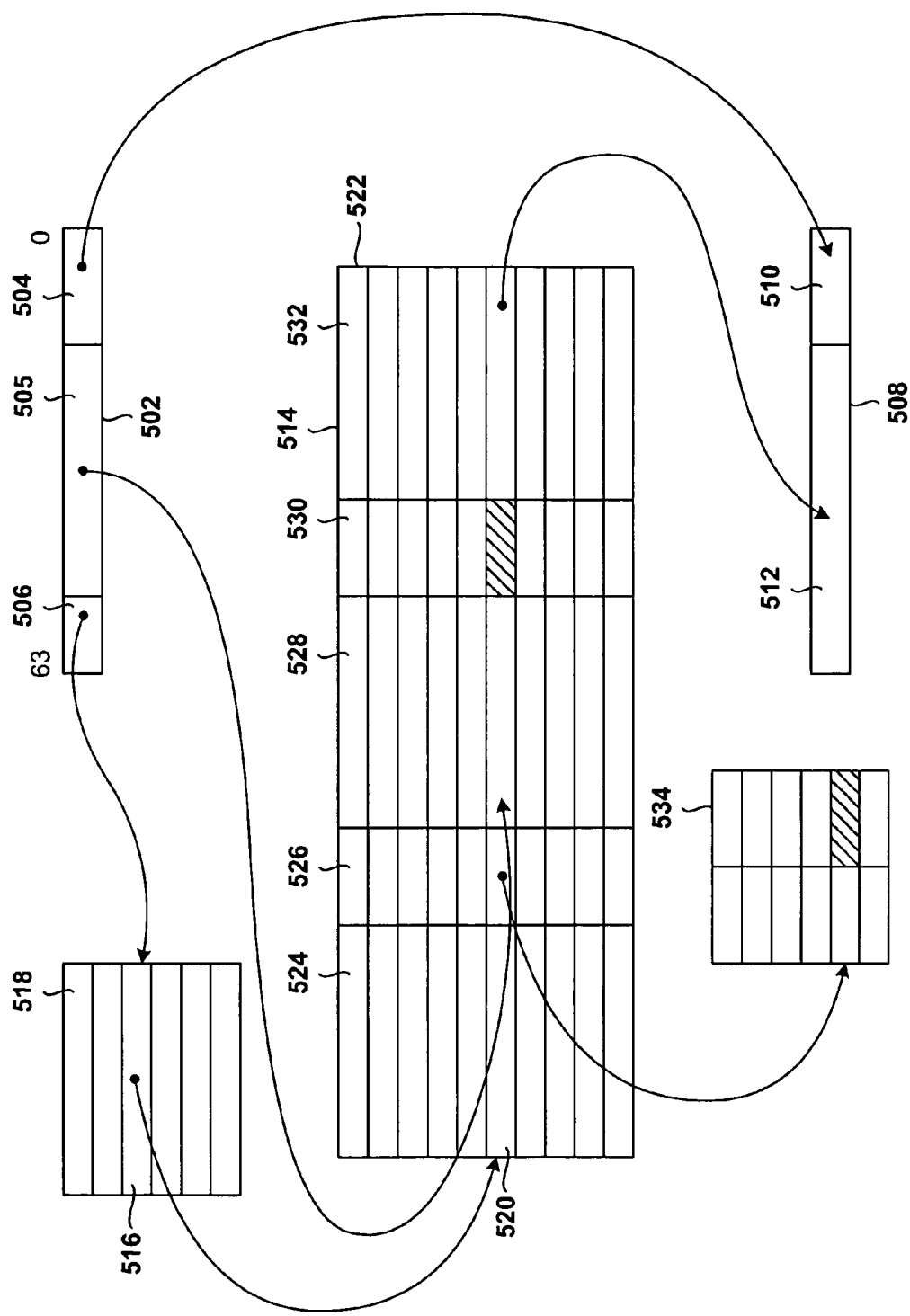
FIG. 5 illustrates translation of a virtual memory address into a physical memory address via information stored within region registers, protection key registers, and a translation look-aside buffer.

In general, however, virtual memory addresses are encoded as 64-bit quantities. FIG. 5 illustrates translation of a 64-bit virtual memory address into a physical memory address via information stored within region registers, protection key registers, and a translation look-aside register buffer ("TLB"). In the Intel® Itanium architecture, virtual addresses are 64-bit computer words, represented in FIG. 5 by a 64-bit quantity 502 divided into three fields 504-506. The first two fields 504 and 505 have sizes that depend on the size of a memory page, which can be adjusted within a range of memory page sizes. The first field 504 is referred to as the "offset." The offset is an integer designating a byte within a memory page. If, for example, a memory page contains 4096 bytes, then the offset needs to contain 12 bits to represent the values 0-4095. The second field 505 contains a virtual page address. The virtual page address designates a memory page within a virtual address space that is mapped to physical memory, and further backed up by memory pages stored on mass storage devices, such as disks. The third field 506 is a three-bit field that designates a region register containing the identifier of a region of virtual memory in which the virtual memory page specified by the virtual page address 505 is contained.

One possible virtual-address-translation implementation consistent with the Itanium architecture is next discussed. Translation of the virtual memory address 502 to a physical memory address 508 that includes the same offset 510 as the offset 504 in the virtual memory address, as well as a physical page number 512 that references a page in the physical memory components of the computer system, is carried out by the processor, at times in combination with operating-system-provided services. If a translation from a virtual memory address to a physical memory address is contained within the TLB 514, then the virtual-memory-address-to-physical-memory-address translation can be entirely carried out by the processor without operating system intervention. The processor employs the region register selector field 506 to select a register 516 within a set of region registers 518. The selected region register 516 contains a 24-bit region identifier. The processor uses the region identifier contained in the selected region register and the virtual page address 505 together in a hardware function to select a TLB entry 520 containing a region identifier and virtual memory address that match the region identifier contained in the selected region register 516 and the virtual page address 505. Each TLB entry, such as TLB entry 522, contains fields that include a region identifier 524, a protection key associated with the memory page described by the TLB entry 526, a virtual page address 528, privilege and access mode fields that together compose an access rights field 530, and a physical memory page address 532.

If a valid entry in the TLB, with present bit=1, can be found that contains the region identifier contained within the region register specified by the region register selector field of the virtual memory address, and that entry contains the virtual-page address specified within the virtual memory address, then the processor determines whether the virtual-memory page described by the virtual-memory address can be accessed by the currently executing process. The currently executing process may access the memory page if the access rights within the TLB entry allow the memory page to be accessed by the currently executing process and if the protection key within the TLB entry can be found within the protection key registers 534 in association with an access mode that allows the currently executing process access to the memory page. Protection-key matching is required only when the PSR.pk field of the PSR register is set. The access rights contained within a TLB entry include a 3-bit access mode field that indicates one, or a combination of, read, write, and execute privileges, and a 2-bit privilege level field that specifies the privilege level needed by an accessing process. Each protection key register contains a protection key of up to 24 bits in length associated with an access mode field specifying allowed read, write, and execute access modes and a valid bit indicating whether or not the protection key register is currently valid. Thus, in order to access a memory page described by a TLB entry, the accessing process needs to access the page in a manner compatible with the access mode associated with a valid protection key within the protection key registers and associated with the memory page in the TLB entry, and needs to be executing at a privilege level compatible with the privilege level associated with the memory page within the TLB entry.

If an entry is not found within the TLB with a region identifier and a virtual page address equal to the virtual page address within the virtual memory address and a region identifier selected by the region register selection field of a virtual memory address, then a TLB miss occurs and hardware may attempt to locate the correct TLB entry from an architected mapping control table, called the virtual hash page table ("VHPT"), located in protected memory, using a hardware-provided VHPT walker. If the hardware is unable to locate the correct TLB entry from the VHPT, a TLB-miss fault occurs and a kernel or operating system is invoked in order to find the specified memory page within physical memory or, if necessary, load the specified memory page from an external device into physical memory, and then insert the proper translation as an entry into the VHPT and TLB. If, upon attempting to translate a virtual memory address to a physical memory address, the kernel or operating system does not find a valid protection key within the protection key registers 534, if the attempted access by the currently executing process is not compatible with the access mode in the TLB entry or the read/write/execute bits within the protection key in the protection key register, or if the privilege level at which the currently executing process executes is less privileged than the privilege level needed by the TLB entry, then a fault occurs that is handled by a processor dispatch of execution to operating system code.

Figure 6:
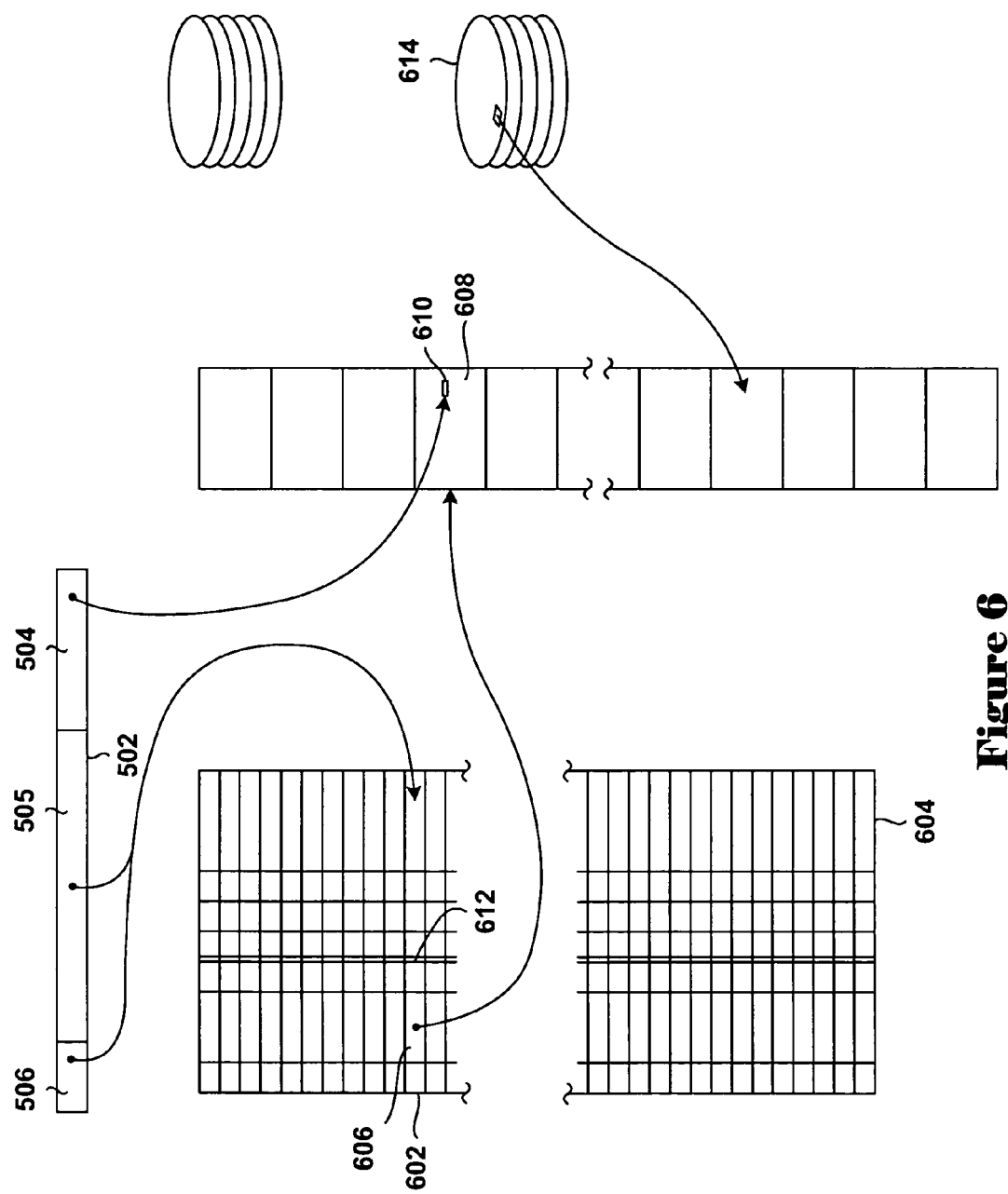
FIG. 6 shows the data structures employed by an operating system to find a memory page in physical memory corresponding to a virtual memory address.

FIG. 6 shows one form of a data structure employed by an operating system to find a memory page in physical memory corresponding to a virtual memory address. The virtual memory address 502 is shown in FIG. 6 with the same fields and numerical labels as in FIG. 5. The operating system employs the region selector field 506 and the virtual page address 505 to select an entry 602 within a virtual page table 604. The virtual page table entry 602 includes a physical page address 606 that references a page 608 in physical memory. The offset 504 of the virtual memory address is used to select the appropriate byte location 610 in the virtual memory page 608. The virtual page table 602 includes a bit field 612 indicating whether or not the physical address is valid. If the physical address is not valid, then the operating system commonly selects a memory page within physical memory to contain the memory page, and retrieves the contents of the memory page from an external storage device, such as a disk drive 614. The virtual page table entry 602 contains additional fields from which the information needed for a TLB entry can be retrieved. Once the operating system successfully maps the virtual memory address into a physical memory address, that mapping is entered into the virtual page table entry and, formatted as a TLB entry, is inserted into the TLB.

FIG. 7 shows the access rights encoding used in a TLB entry. Access rights comprise a 3-bit TLB.ar mode field 702 that specifies read, write, execute, and combination access rights, and a 2-bit TLB.pl privilege level field 704 that specifies the privilege level associated with a memory page. In FIG. 7, the access rights for each possible value contained within the TLB.ar and TLB.pl fields are shown. Note that the access rights depend on the privilege level at which a current process executes. Thus, for example, a memory page specified with a TLB entry with TLB.ar equal to 0 and TLB.pl equal to 3 can be accessed for reading by processes running at any privilege level, shown in FIG. 7 by the letter "R" in the column corresponding to each privilege level 706-709, while a memory page described by a TLB entry with TLB.ar equal to 0 and TLB.pl equal to 0 can be accessed by reading only by a process running at privilege level 0, as indicated in FIG. 7 by the letter "R" 710 under the column corresponding to privilege level 0. The access rights described in FIG. 7 nest by privilege level according to the previous discussion with reference to FIG. 4. In general, a process running at a particular privilege level may access a memory page associated with that privilege level and all less privileged privilege levels. Using only the access rights contained in a TLB entry, it is not possible to create a memory region accessible to a process running at level 3 and the kernel running at level 0, but not accessible to an operating system running at privilege level 2. Any memory page accessible to a process running at privilege level 3 is also accessible to an operating system executing at privilege level 2.

Figure 8A:
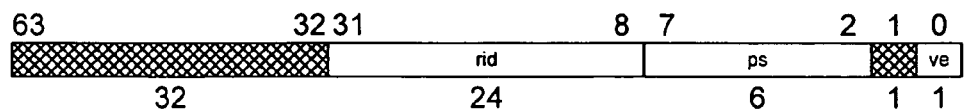
FIGS. 8A-B provide details of the contents of a region register and the contents of a VHPT long-format entry.
Figure 8B:
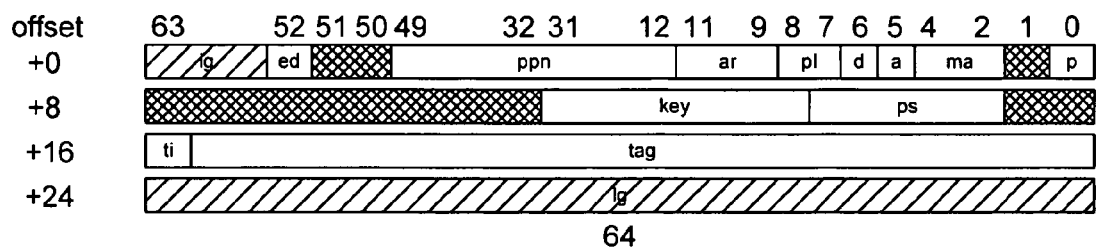

FIGS. 8A-B provide details of the contents of a region register and the contents of a VHPT long-format entry, respectively. As shown in FIG. 8A, a region register includes the following fields: (1) "ve," a 1-bit Boolean field indicating whether or not the VHPT walker is enabled; (2) "ps," a 6-bit field indicating a preferred page size for the region, where the preferred page size is $2^{ps}$; and (3) "RID," a 24-bit region identifier. A VHPT long-format entry, as shown in FIG. 8B, includes the following fields: (1) "p," a 1-bit Boolean field indicating whether or not the corresponding page is resident in physical memory and other fields in the entry contain meaningful information; (2) "ma," a 3-bit field, called "memory attribute," which describes caching, coherency, write-policy, and speculative characteristics of the mapped physical page; (3) "a," a 1-bit field that, when zero, causes references to the corresponding page to generate access faults; (4) "d," a 1-bit Boolean field that specifies generation of dirty-bit faults upon store or semaphore references to the corresponding page; (5) "pl," a 2-bit field indicating the privilege level for the corresponding page; (6) "ar," a 3-bit access-rights field that includes the read, write, and execute permissions for the page; (7) "ppn," a 38-bit field that stores the most significant bits to the mapped physical address; (8) "ed," a 1-bit Boolean field whose value contributes to determining whether to defer a speculative load instruction; (9) "ps," a 6-bit field indicating the page size for virtual-memory mapping; (10) "key," a protection key associated with the corresponding virtual page; (11) "tag," a translation tag used for hash-base searching of the VHPT; and (12) "ti," a 1-bit Boolean field indicating whether or not the translation tag is valid.

Figure 9A:
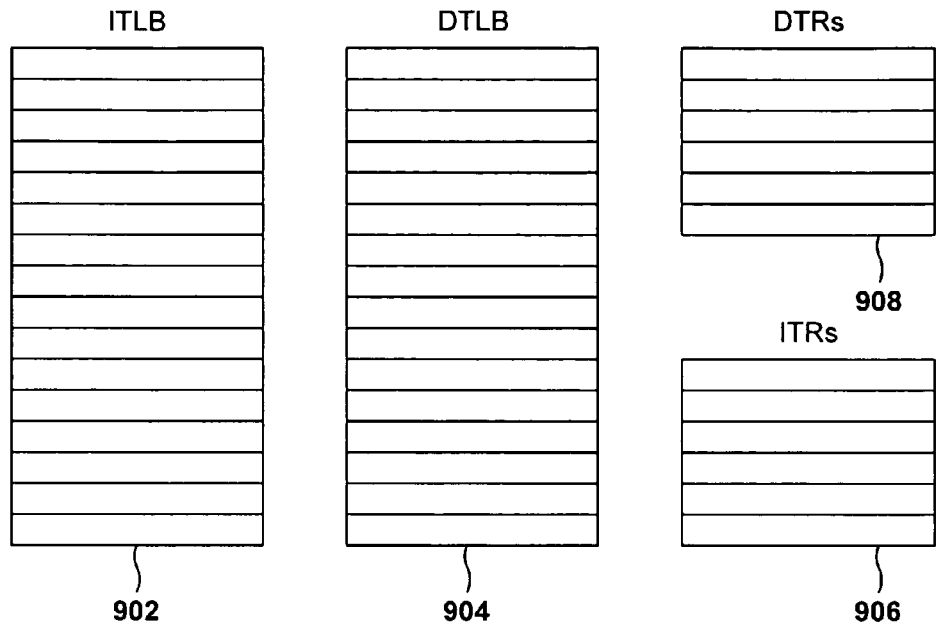
FIGS. 9A-B provide additional details about the virtual-memory-to-physical-memory translation caches and the contents of translation-cache entries.
Figure 9B:
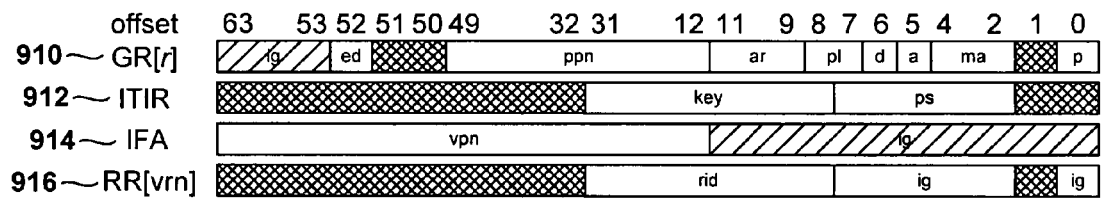

FIGS. 9A-B provide additional details about the virtual-memory-to-physical-memory translation caches and the contents of translation-cache entries. The Itanium provides four translation structures, as shown in FIG. 9A. These include an instruction TLB ("ITLB"), a data TLB ("DTLB") 904, a set of instruction translation registers ("ITRs") 906, and a set of data translation registers ("DTRs") 908. The four translation structures are together referred to as the "TLB." Entries are placed into the ITLB, DTLB, ITRs, and DTRs by using the privileged instructions itc.i, itc.d, itr.i, and itr.d, respectively. As discussed above, the ITLB and DTLB serve as a first cache for virtual-memory-to-physical-memory translations.

FIG. 9B shows the contents of registers used to insert translation-cache entries into the TLB using the above-described privileged instructions. The contents of four different registers are employed: (1) a general register 910 specified as an operand to the privileged instruction, the interruption TLB insertion register ("ITIR") 912, the interruption faulting address register ("IFA") 914, and the contents of the region register 916 selected by the most significant 3 bits of the IFA register 914. Many of the fields shown in FIG. 9B are identical to the fields in the VHPT long-format entry, shown in FIG. 8B, and are not again described, in the interest of brevity. The field "vpn" in the IFA register contains the most significant bits of a virtual-memory address. In both a VHPT entry and a translation-cache entry, the most significant bits of a physical page address and virtual-memory-page address (with page-offset bits assumed to be 0) represent the address of a first byte of a physical page and virtual-memory page, respectively. Thus, VHPT entries and TLB entries are referred to as corresponding both to virtual-memory addresses and to virtual-memory pages. The unspecified, least-significant bits of a physical-memory address or virtual-memory address an offset, in bytes, within the physical memory or virtual memory page specified by the most significant bits.

Figure 10:
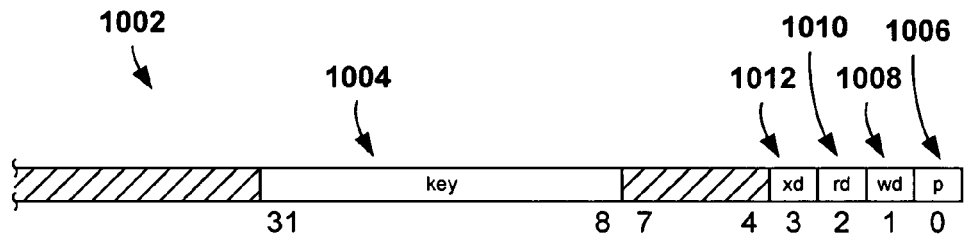
FIG. 10 provides additional details regarding the contents of protection-key registers.

FIG. 10 provides additional details regarding the contents of protection-key registers. The format for a protection-key register 1002 includes a 24-bit key field 1004 and four different single-bit fields that include: (1) a valid bit 1006, which indicates whether or not the protection-key register contains valid contents and is therefore employed by the processor during virtual-address translation; (2) a write-disable bit 1008, which, when set, results in write access denied to pages, the translations for which include the protection key contained in the protection-key field 1004; (3) a read-disable bit, which, when set, disables read access to pages, the translations for which contain the key contained in the key field 1004; and (4) an execute-disable bit 1012, which, when set, prevents execute access to pages, the translations for which contain the key contained in the key field 1004. The read-disable, write-disable, and execute-disable bits in protection key registers provide an additional mechanism to control access to pages, on a key-domain basis rather than on a per-page-access-rights basis.

Embodiments of the Present Invention

Figure 11:
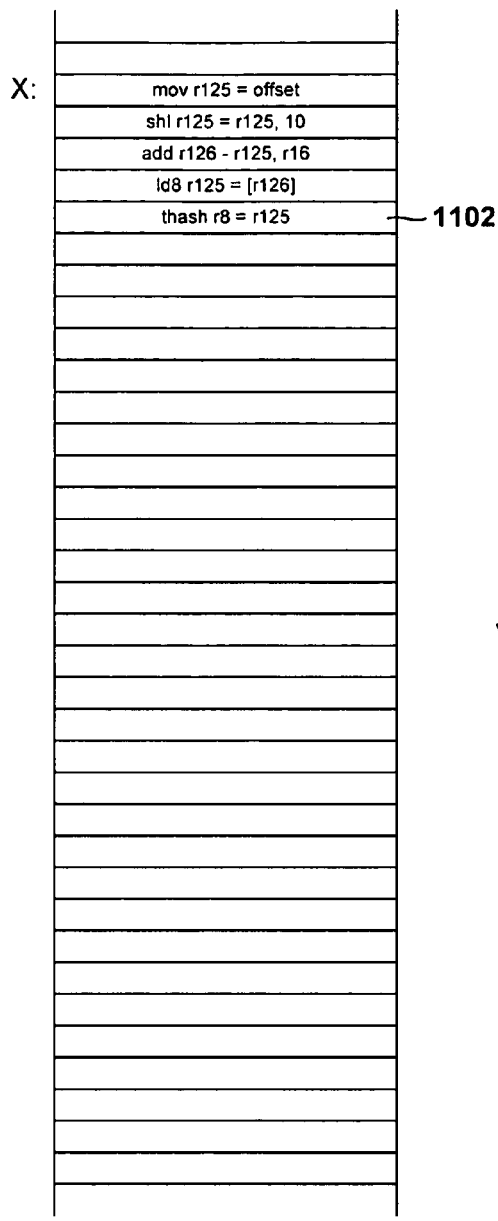
FIGS. 11 and 12 illustrate a problem with binary translation of instructions to be emulated by a virtual-machine monitor.
Figure 12:
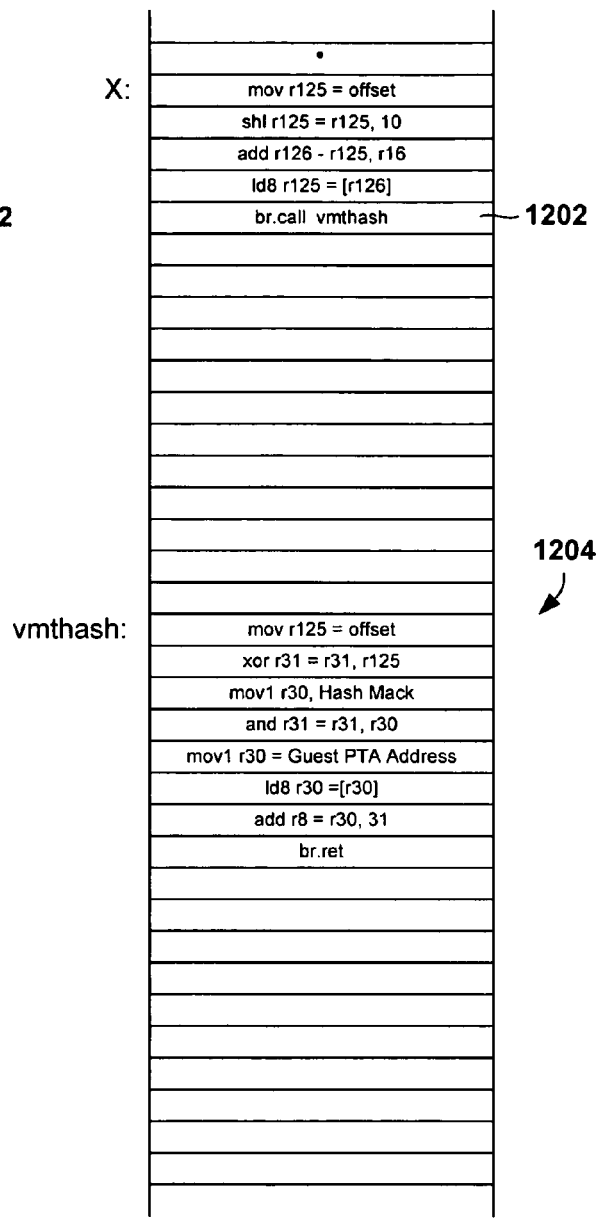

FIGS. 11 and 12 illustrate a problem with binary translation of instructions to be emulated by a virtual-machine monitor. FIG. 11 shows a portion of guest-operating-system executable code as a column of 64-bit words. In FIG. 11, the memory 1102 is shown as containing a single instruction in each memory word. The Itanium architecture stores three instructions in each pair of 64-bit words. An instruction-per-word convention is adopted in FIG. 11, and in subsequent Figures, to facilitate discussion of instruction recognition without the overhead of the extra procedural steps needed dealing with bundled instructions. Those skilled in the art can appreciate that no generality is lost in adopting an instruction-per-word paradigm for describing embodiments of the present invention. Moreover, in many computer architectures, a single instruction is, in fact, stored in every natural word of a memory section storing executable code. Note also that the instruction contents of only a few of the memory locations are explicitly shown in FIGS. 11 and 12. At address X, the executable code includes a number of instructions that prepare for a thash instruction 1102. The thash instruction translates a virtual address into a value that can then be used to locate a translation for the virtual address in the VHPT. The thash instruction is not privileged, and therefore execution of the thash instruction by a guest operating system is not as easily intercepted by a virtual-machine monitor as execution of privileged instructions that automatically generate privileged-instruction faults when attempted to be executed by a program or routine running at less than the most-privileged privilege level, as a virtual-machine monitor arranges for a guest operating system to run. More importantly, it would be rather inefficient for a virtual-machine monitor to emulate each thash instruction, and other such instructions, using the mechanism of faults and interruptions and emulation in fault interruption handlers. Instead, as shown in FIG. 12, a virtual-machine monitor can patch the instruction to be emulated, in this case the thash instruction at memory address X, by introducing a br.call instruction 1202 that transfers execution to a small virtual-monitor patch routine vmthash 1204 that emulates the instruction and returns execution to the instruction following the branch.call 1202 instruction introduced into the executable code in place of the instruction to be emulated.

As shown in FIG. 12, the thash instruction (1102 in FIG. 11) at address X has been replaced with a br.call instruction 1202 which calls a small patch routine "vmthash" at logical address vmthash 1204. This patch routine uses registers $r_{30}$ and $r_{31}$. However, the virtual-machine monitor needs to preserve the original contents of $r_{30}$ and $r_{31}$ so that the remaining guest-operating-system executable code following the emulated instruction, which counts on the previous contents of $r_{30}$ and $r_{31}$ to be preserved, continues to properly work. shown in FIG. 12 to severe problems. None of the general registers of an itanium processor are unused or reserved for code executing at the most privileged privilege level, such as a virtual-machine monitor. Thus, the virtual-machine monitor cannot assume that general registers $r_{125}$ and $r_{126}$ do not contain values subsequently needed by the guest operating system. An additional problem in the Itanium architecture is that memory-access instructions employ general registers as operands, and memory cannot be accessed by immediate operands or absolute addresses encoded into instructions. Therefore, the virtual-machine monitor needs a free general register for the load instruction 1208, in the exemplary patch code using general register $r_{125}$.

Figure 13:
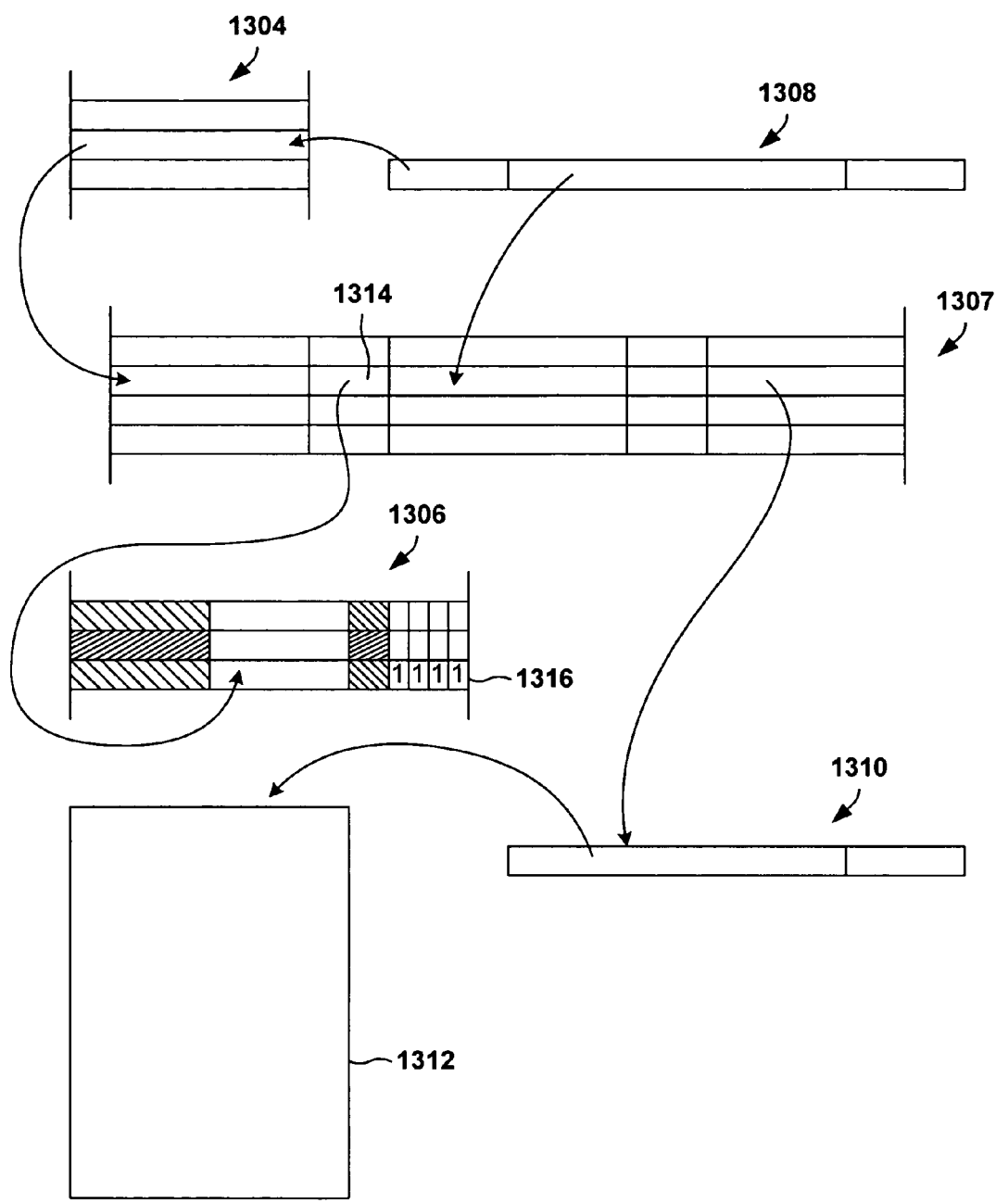
FIG. 13 shows a method by which a virtual-machine monitor can detect the execution of privileged code used in one embodiment of the present invention.

An approach to binary translation by virtual-machine monitors on the itanium architecture, and other modern processors that suffer the problems illustrated in FIGS. 11-12, is next presented, with reference to FIGS. 13-18. FIG. 13 shows a method by which a virtual-machine monitor can detect entry into the guest-operating-system kernel code used in one embodiment of the present invention. Of course, any interruption or fault-based kernel entries are automatically intercepted by the virtual-machine monitor, as discussed above. However, the itanium architecture provides a more efficient means for executing code to transition to code executing at the most-privileged privilege level, generally kernel code. That mechanism involves the epc instruction by which highest-privileged-level code can be invoked directly, without transitioning through an interruption.

FIG. 13 shows portions of various components of the virtual-address translation mechanism discussed above with reference to FIG. 5, including the translation lookaside buffer ("TLB") 1302, a portion of the region registers 1304, a portion of the protection-key registers 1306, a virtual address to be translated 1308, and the physical address corresponding to the virtual address 1310, along with a representation 1312 of the physical page to which the physical address corresponds. Virtual monitor can insert a special key 1314 into the virtual address translation for a virtual address that corresponds to the contents of the key field of a protection-key-register value associated with a no-access protection-key domain. Note that, in FIG. 13, the protection-key-register value 1316 associated with the no-access protection-key domain has all three of the execute-disable, write-disable, and read-disable bits set, so that any attempt to access the page automatically generates a key-permission fault. A virtual-machine monitor can place all translated emulation code on separate pages, assign these pages to the no-access domain, in order to execute state-saving code before executing emulation code sequences. Thus, the virtual-machine monitor can detect transitions to guest-operating-systems code either by faults and interruptions or by detecting execution of privileged services.

Figure 14:
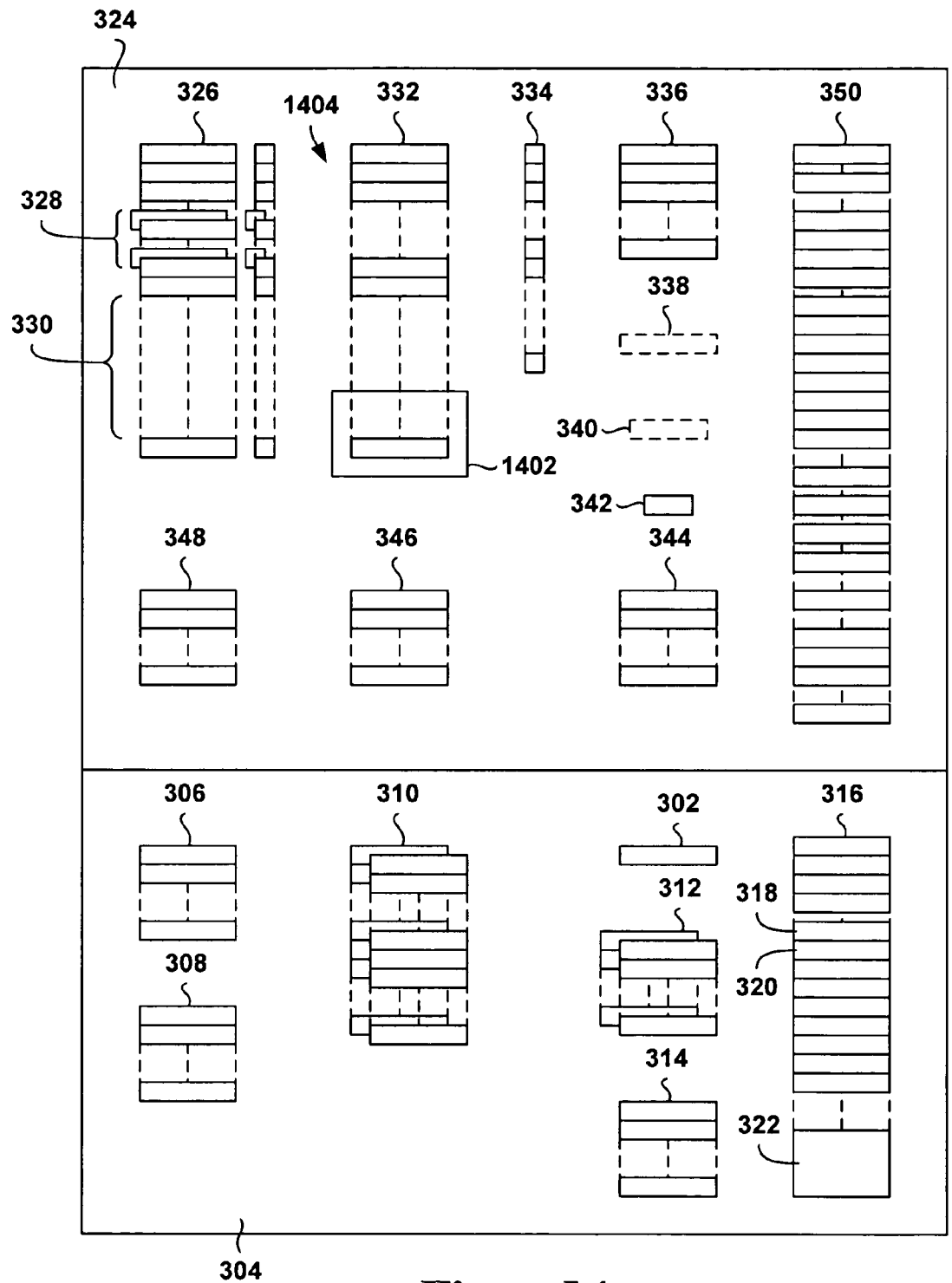
FIG. 14 shows the register resources used, in various embodiments of the present invention, to provide scratch register space for virtual-monitor-introduced binary translations.

FIG. 14 shows the register resources used, in various embodiments of the present invention, to provide scratch register space for virtual-monitor-introduced binary translations. Operating systems only rarely use floating-point registers. Therefore, in various embodiment of the present invention, a small set of floating-point registers 1402 at the high end of the floating-point register file 1404 are used as scratch registers for binary translations or virtual-monitor patch routines. The virtual-machine monitor intercepts each entry into kernel code by the guest operating system and stores the contents of the scratch floating-point registers into a special virtual-monitor memory area. The virtual-machine monitor can then freely employ the floating-point scratch registers for binary-translation scratch registers, using the setf.sig and getf.sig instructions to move values from general registers to floating-point scratch registers, and from floating-point scratch registers back to general registers. Upon exit of guest-operating-system kernel code, detected by the virtual-machine monitor by a transition in privilege level (either through a demoting branch-return or execution of a return-from-interruption instruction), the virtual-machine monitor restores the contents of the floating-point scratch registers from the special, virtual-monitor memory area. In the rare event that floating-point registers are used by the guest operating system, the virtual-machine monitor patches instructions that use the floating-point scratch registers to instead access directly the virtual-monitor special memory area corresponding to the floating-point scratch registers. Therefore, although the virtual-monitor pays a small price in emulating the guest-operating-system instructions that access floating-point scratch registers, guest operating systems use floating-point registers so infrequently that the price is essentially insignificant.

Figure 15:
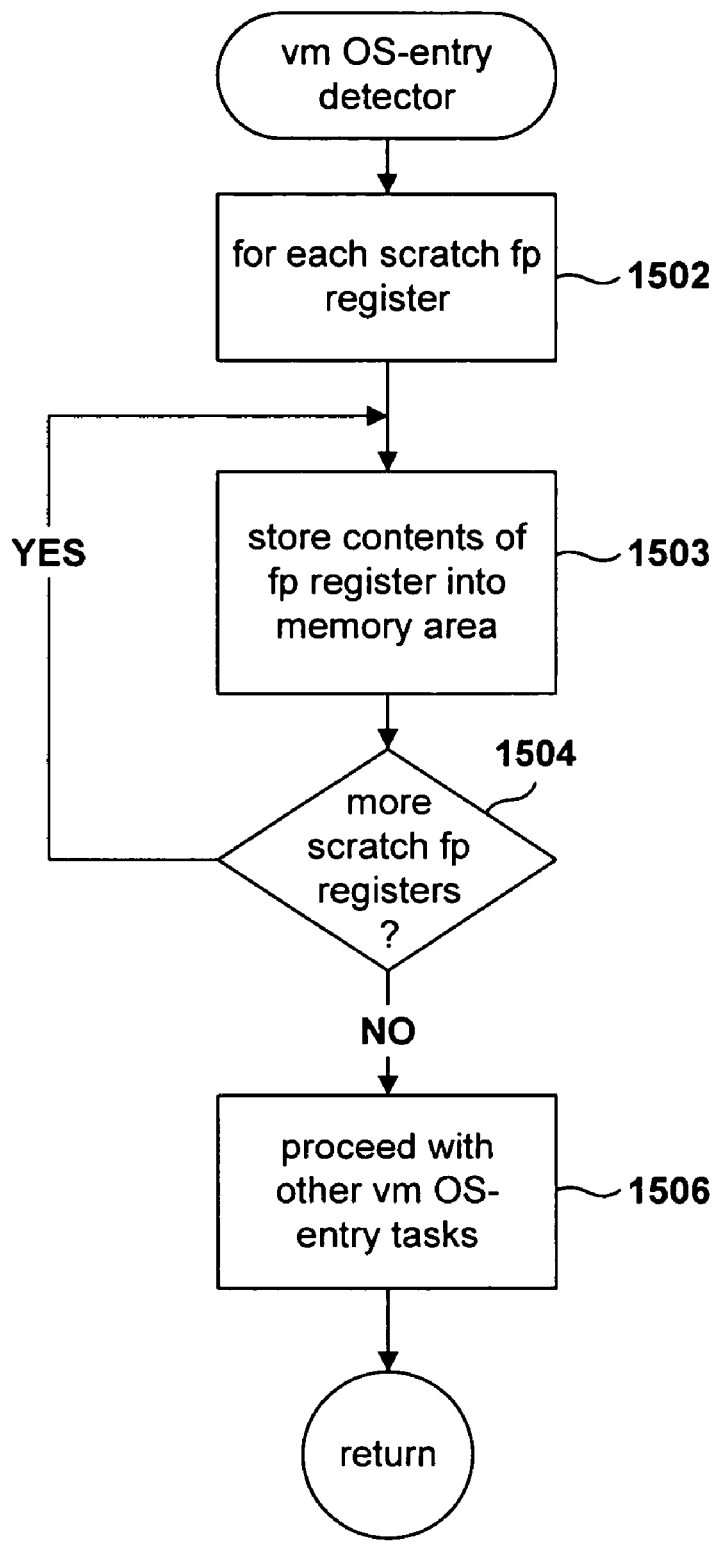
FIG. 15 is a control-flow diagram illustrating enhancement of a virtual-monitor guest-operating-system-entry detector in various embodiments of the present invention.

FIG. 15 is a control-flow diagram illustrating enhancement of a virtual-monitor guest-operating-system-entry detector in its various embodiments of the present invention. Note that the virtual-monitor guest-operating-system-entry detector is invoked, as discussed above, either during handling of key-permission faults associated with the no-access permission-key domain, or during normal interruption and fault handling by the virtual-machine monitor. In the for-loop of steps 1502-1504, the virtual-machine monitor stores the contents of each floating-point scratch register into a special virtual-monitor memory area accessible only to the virtual-machine monitor or virtual-monitor-inserted binary translations. Once the values are stored, the virtual-machine-monitor introduced binary translations are free to subsequently use the floating-point scratch registers for instruction emulation while guest-operating-system code continues to execute. In step 1506, the virtual-machine monitor proceeds to carry out any normal operating-system-entry-detector tasks.

Figure 16:
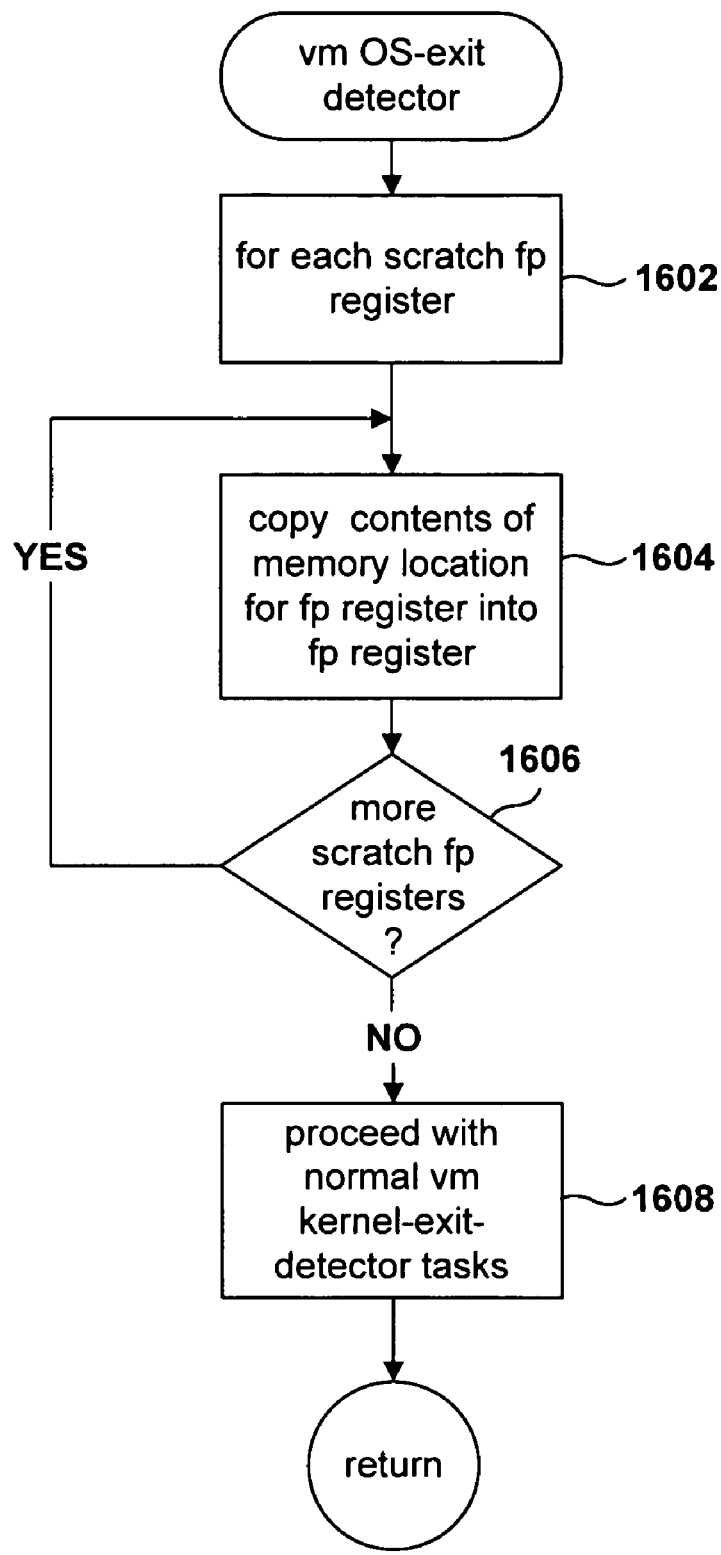
FIG. 16 illustrates enhancements to a virtual-monitor guest-operating-system-exit detector needed to implement various embodiments of the present invention.

FIG. 16 illustrates enhancements to a virtual-monitor guest-operating-system-exit detector needed to implement various embodiments of the present invention. Note that the virtual-monitor guest-operating-system-exit detector is invoked when a virtual-machine monitor detects a change from a higher-privilege-level machine state to a lower-privilege-level machine state during execution of a guest operating system. Such higher-to-lower privilege-level transitions can be accomplished using privileged instructions, which generate privilege-instruction faults intercepted by the virtual-machine monitor when executed by the guest operating system, or with a demoting return-branch instruction. In the for-loop of steps 1602-1606, the virtual-machine monitor restores the values of the floating-point scratch registers from the special virtual-monitor memory area in which the values were stored in the most recent entry to guest-operating-system code. Then in step 1608, the virtual-machine monitor continues to carry out any normal virtual-monitor guest-operating-system-exit-detector code.

Figure 17:
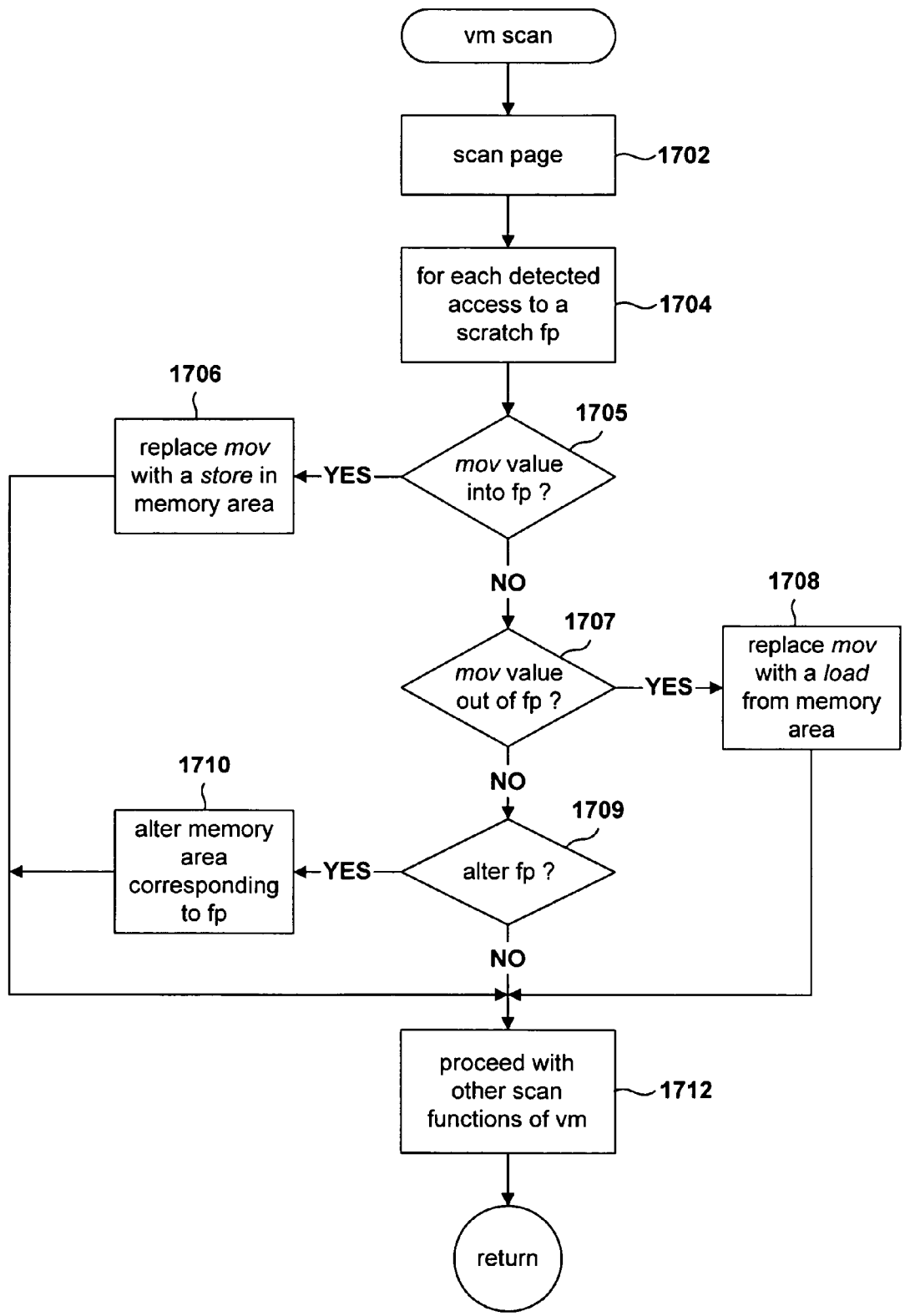
FIG. 17 illustrates enhancements to virtual-monitor page scanning needed to implement various embodiments of the present invention.

FIG. 17 illustrates enhancements to virtual-monitor page scanning needed to implement various embodiments of the present invention. The virtual-machine monitor scans guest-operating-system code pages to detect instructions that need to be emulated, replacing such instructions with binary translations, when possible. The virtual-machine monitor may scan guest-operating-system pages prior to launching the guest operating system, in a preprocessing state, and may also dynamically scan pages just prior to their execution as the guest operating system executes. In either case, scanning enhancements illustrated in FIG. 17 allow the virtual-machine monitor to detect use, by guest-operating-system code, of the floating-point scratch registers, and emulate instructions that use the floating-point scratch registers, since the original values of the floating-point scratch registers have been stored in the special virtual-monitor memory area, and the floating-point scratch register values may have subsequently been overwritten. In step 1702, the page is scanned by the virtual-machine monitor to detect instructions that need to be emulated. In the for-loop of steps 1704-1710, the virtual-machine monitor emulates each detected instruction that accesses a floating-point scratch register. For each such instruction, the virtual-machine monitor determines, in step 1705, whether the detected instruction moves a value into a floating-point scratch register. If so, then the virtual-machine monitor replaces the mov instruction with a store instruction that stores the value into the virtual-monitor special memory area corresponding to the floating-point scratch register. Otherwise, in step 1707, the virtual-machine monitor determines whether the detected instruction moves a value out of a floating-point scratch register. If so, then in Step 1708, the virtual-machine monitor replaces the mov instruction with a load instruction that loads the value in the memory area corresponding to the floating-point scratch register into an appropriate location. Otherwise, if the instruction alters the contents of a floating-point scratch register by a more complex operation, as determined in step 1709, then the virtual-machine monitor introduces a binary translation that similarly alters the contents of the memory area location storing the value for the floating-point scratch register in step 1710. If the original code is, for example, a move of register $r_a$ to floating-point register $f_b$, the binary translation may require freeing up a scratch register, $r_x$, for the translated sequence by moving the contents of $r_x$ into another floating-point scratch register $f_y$, loading $r_x$ with the address of the memory area where the original $f_b$ register is saved, carrying out the operation on the general register, in this case, storing the contents or $r_a$ in floating-point format to the address $r_x$ in the virtual-monitor special memory area where $f_b$ is stored, and finally restoring the original contents of the scratch register $r_x$ from the floating-point scratch registers. When all the instructions that access floating-point scratch registers are emulated, the virtual-machine monitor proceeds with other scan functions in step 1712.

FIG. 18 shows a solution to the binary-translation problem illustrated in FIGS. 11-12 using an embodiment of the present invention. As shown in FIG. 18, rather than simply using registers $r_{30}$ and $r_{31}$ directly, as in the patch routine shown in FIG. 12, the current contents of general registers $r_{30}$ and $r_{31}$ are saved into floating-point scratch registers $f_{127}$ and $f_{126}$ in two instructions 1802 and 1804 of the patch routine. Later, the original values of general registers $r_{30}$ and $r_{31}$ are restored by instructions 1808 and 1810. Thus, in the patch code in FIG. 18, general registers $r_{30}$ and $r_{31}$ can be freely used within the patch routine, since their original contents are first stored, a the beginning of the patch routine, and then restored, at the end of the patch routine.

Although the present invention has been described in terms of a particular embodiment, it is not intended that the invention be limited to this embodiment. Modifications within the spirit of the invention will be apparent to those skilled in the art. For example, any rarely used register resources of a particular machine architecture can be used by a virtual-machine monitor for scratch registers by first storing the current contents of the register resources into virtual-monitor-accessible memory and re-storing the contents of the register resources from virtual-monitor-accessible memory prior to, and after, execution of guess-operating-system code. Any number of different techniques for intercepting entry into, and exit from, guest-operating-system code may be employed by a virtual-machine monitor to implement the present invention.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for obtaining scratch registers for use by a virtual-machine monitor for virtualization tasks, the method comprising:
   identifying a set of registers infrequently used in code to be virtualized;
   detecting entry to the code to be virtualized;
   storing contents of the set of infrequently used registers in memory accessible only to the virtual-machine monitor;
   detecting exit from the code to be virtualized at run time; and
   restoring the contents of the infrequently used registers from memory;
wherein the virtual-machine monitor detects entry to the code to be virtualized by one or more of:
   intercepting execution of a privileged instruction through a privileged-instruction fault; and
   intercepting attempted execution of a virtual-memory page assigned to a protection-key domain that does not permit execution access to the virtual-memory page.

2. The method of claim 1 wherein the infrequently used registers are floating-point registers.

3. The method of claim 1 wherein the code to be virtualized is guest-operating-system code that interfaces to a virtual-machine interface provided by the virtual-machine monitor.

4. The method of claim 1 wherein the virtual-machine monitor detects exit from the code to be virtualized by one or more of:
   intercepting execution of a privileged instruction through a privileged-instruction fault; and
   intercepting attempted decrease in machine privilege level.

5. The method of claim 1 further including detecting use, by the code to be virtualized, of a register of the set of infrequently used registers at run time and emulating that use by:

detecting moving a value into the register and emulating the value-move operation by storing the value into a memory location corresponding to the register.

6. The method of claim 1 further including detecting use, by the code to be virtualized, of a register of the set of infrequently used registers at run time and emulating that use by:

detecting moving a value from the register and emulating the value-move operation by loading the value from a memory location corresponding to the register.

7. The method of claim 1 further including detecting use, by the code to be virtualized, of a register of the set of infrequently used registers at run time and emulating that use by:

detecting altering the value stored in the register and emulating the value-altering operation by altering the value in a memory location corresponding to the register.

8. Computer-readable instructions stored in a non-transitory computer-readable medium that implement the method of claim 1.

9. A virtual-machine monitor, which includes instructions that implement the method of claim 1, that is executed by a computer processor to provide a virtual-machine interface execution environment for additional programs, including operating systems and application programs.

* * * * *